(12) United States Patent
Slack, Jr.

(10) Patent No.: US 10,981,654 B2
(45) Date of Patent: Apr. 20, 2021

(54) BEVERAGE HOLDER

(71) Applicant: Martin Stephen Slack, Jr., Redondo Beach, CA (US)

(72) Inventor: Martin Stephen Slack, Jr., Redondo Beach, CA (US)

(*) Notice: Subject to any disclaimer, the term of this patent is extended or adjusted under 35 U.S.C. 154(b) by 56 days.

(21) Appl. No.: 16/442,002

(22) Filed: Jun. 14, 2019

(65) Prior Publication Data

US 2020/0002006 A1      Jan. 2, 2020

Related U.S. Application Data

(60) Provisional application No. 62/691,000, filed on Jun. 28, 2018.

(51) Int. Cl.
| | |
|---|---|
| *B64D 11/06* | (2006.01) |
| *F16M 13/02* | (2006.01) |
| *A47G 29/093* | (2006.01) |
| *A47G 23/02* | (2006.01) |

(52) U.S. Cl.
CPC ...... *B64D 11/0638* (2014.12); *A47G 23/0225* (2013.01); *A47G 29/093* (2013.01); *F16M 13/022* (2013.01); *F16M 2200/021* (2013.01); *F16M 2200/041* (2013.01); *F16M 2200/06* (2013.01)

(58) Field of Classification Search
CPC .. B64D 11/0638; A47G 29/093; A47G 23/02; A47G 23/0208; A47G 23/0216; A47G 23/0225; F16M 13/022; F16M 2200/021; F16M 2200/041; F16M 2200/06

USPC ............ 248/311.2, 278.1, 316.1, 316.4, 313, 248/231.61, 207; 224/148.4, 148.7, 558, 224/926, 544; 220/737, 751
See application file for complete search history.

(56) References Cited

U.S. PATENT DOCUMENTS

| | | | | |
|---|---|---|---|---|
| 2,926,879 A | * | 3/1960 | Dietrich | A47J 45/00 248/311.2 |
| 3,045,962 A | * | 7/1962 | Paulus | B63B 29/12 248/220.21 |
| 3,734,439 A | * | 5/1973 | Wintz | B63B 29/12 248/224.51 |
| 4,131,259 A | | 12/1978 | Franks | |
| 4,191,350 A | * | 3/1980 | Ormond | A01K 97/04 248/292.13 |
| 4,721,276 A | * | 1/1988 | Moss | B60N 3/10 248/205.2 |
| 4,819,843 A | * | 4/1989 | Nakayama | B60N 3/103 108/44 |
| 4,877,164 A | * | 10/1989 | Baucom | B60N 3/101 224/544 |
| 4,887,784 A | | 12/1989 | Kayali | |
| 5,014,956 A | * | 5/1991 | Kayali | B60N 3/102 248/311.2 |
| 5,106,046 A | * | 4/1992 | Rowles | B60N 3/103 248/214 |

(Continued)

*Primary Examiner* — Christopher Garft
*Assistant Examiner* — Michael McDuffie
(74) *Attorney, Agent, or Firm* — Dunlap Bennett & Ludwig, PLLC

(57) ABSTRACT

A beverage holder is provided. The beverage holder embodies an adjustable tray clamp, an articulating arm, a self-leveling functionality and a plurality of lockable joints for enabling an adaptable stable, level, secure, and a selectively movable holder of a passenger's beverage, thereby enhancing their travel seat and overcoming typical tray space limitations.

9 Claims, 4 Drawing Sheets

(56) References Cited

U.S. PATENT DOCUMENTS

| | | | |
|---|---|---|---|
| 5,139,222 A | 8/1992 | Koorey et al. | |
| 5,190,257 A | 3/1993 | Gradei et al. | |
| 5,489,055 A | 2/1996 | Levy | |
| 5,664,718 A | 9/1997 | Vine | |
| 5,853,158 A * | 12/1998 | Riggle | A47G 23/0225 248/311.2 |
| 6,045,017 A * | 4/2000 | Connell | A45F 5/02 224/148.4 |
| 6,264,153 B1 | 7/2001 | Ragner et al. | |
| 6,325,350 B1 | 12/2001 | Mancuso | |
| 6,390,427 B1 * | 5/2002 | McConnell | B60N 3/103 248/228.3 |
| 6,390,431 B1 | 5/2002 | Ott | |
| 6,601,813 B1 * | 8/2003 | Kager | A45D 20/12 248/314 |
| 6,644,612 B2 * | 11/2003 | Webb | A47G 23/0225 248/311.2 |
| 6,896,231 B1 * | 5/2005 | Sullivan, Sr. | A47G 23/0225 248/276.1 |
| 8,757,573 B1 * | 6/2014 | Barnes, Jr. | A47G 23/0225 248/311.2 |
| 9,109,744 B1 * | 8/2015 | Guerrero | A47G 23/02 |
| 9,345,353 B2 * | 5/2016 | Forbes | B62B 3/1472 |
| 9,944,209 B1 | 4/2018 | Carnevali | |
| 10,588,812 B2 * | 3/2020 | Brockway | A61H 1/00 |
| 2003/0197104 A1 | 10/2003 | Heybl et al. | |
| 2004/0238706 A1 | 12/2004 | Mancuso | |
| 2006/0022106 A1 | 2/2006 | Mackin | |
| 2007/0138225 A1 | 6/2007 | Duchesne | |
| 2008/0061197 A1 * | 3/2008 | Carnevali | F16M 11/2078 248/181.1 |
| 2008/0296334 A1 * | 12/2008 | Carnevali | B60R 11/0241 224/558 |
| 2010/0084531 A1 | 4/2010 | Schuchman | |
| 2011/0079696 A1 * | 4/2011 | Hofferber | A47G 23/0225 248/313 |
| 2014/0246550 A1 * | 9/2014 | Thier | A47G 23/0216 248/226.11 |
| 2015/0274300 A1 | 10/2015 | Moore | |
| 2015/0353200 A1 | 12/2015 | Thomaschewski et al. | |
| 2016/0305602 A1 * | 10/2016 | Carthey | F16M 11/18 |
| 2017/0146892 A1 * | 5/2017 | Wei | F16M 11/10 |
| 2018/0207353 A1 * | 7/2018 | Hesketh | A61M 5/1415 |
| 2019/0350394 A1 * | 11/2019 | Jones | A47G 23/0216 |

* cited by examiner

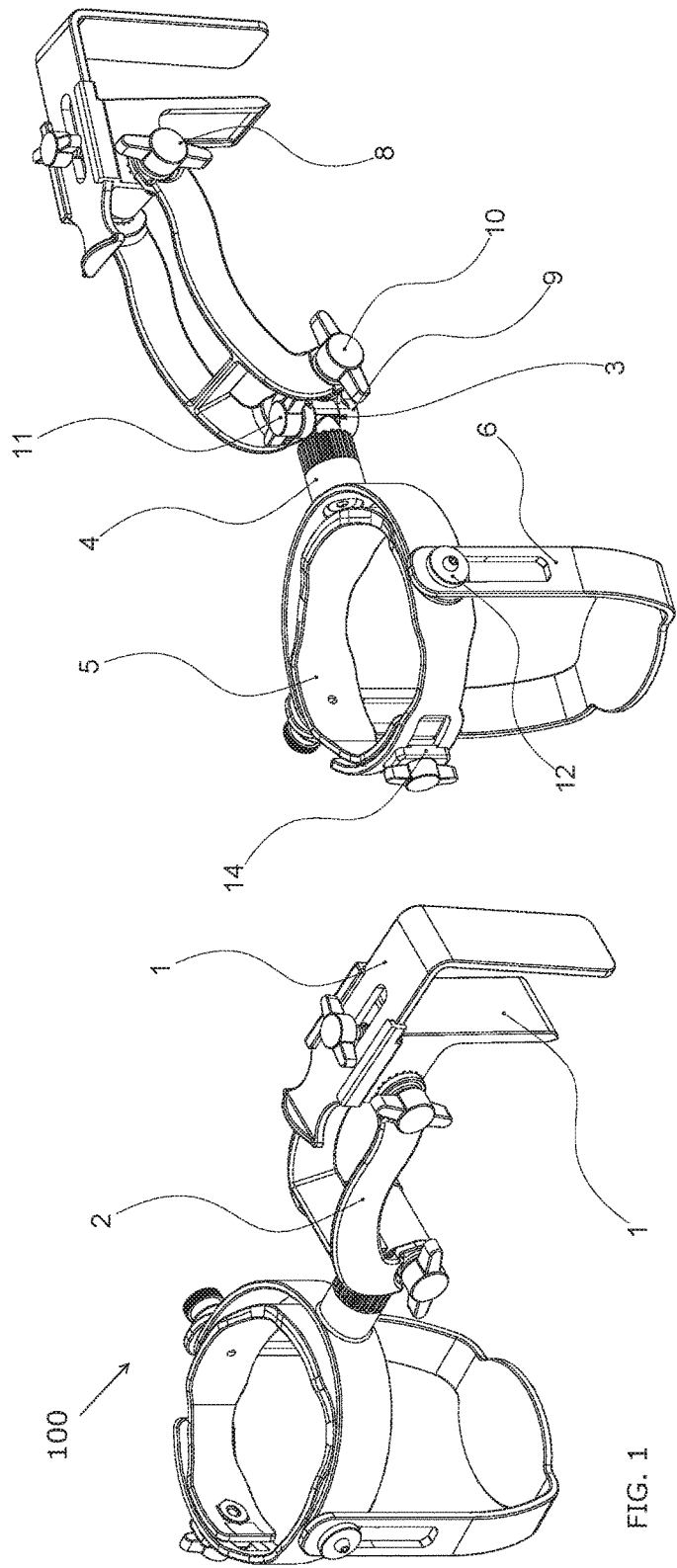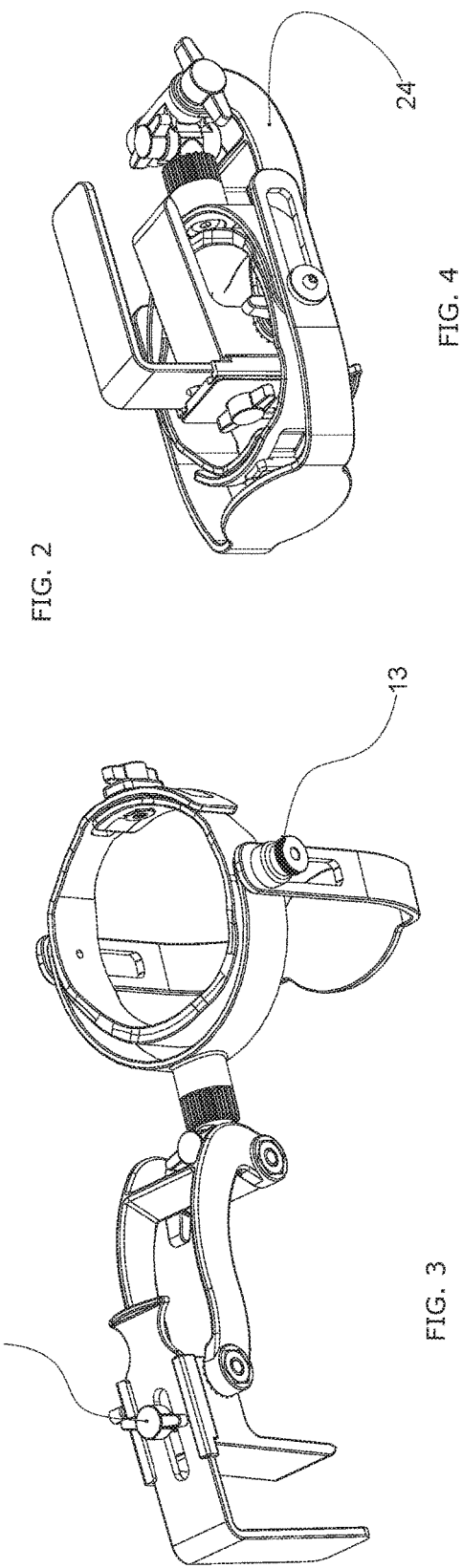

BEVERAGE HOLDER

CROSS-REFERENCE TO RELATED APPLICATION

This application claims the benefit of priority of U.S. provisional application No. 62/691,000, filed 28 Jun. 2018 the contents of which are herein incorporated by reference.

BACKGROUND OF THE INVENTION

The present invention relates to beverage holders and, more particularly, a beverage holder providing a stable, self-leveling, secure, and more convenient location for beverages while enhancing the travel seat experience despite their inherent tray space limitations.

There is very little room to move while traveling in most passenger seats due to the very limited and cramped area between the seats, such as on an airplane. There is also no place to easily store a drink or other personal items due to there being no drink holders or seat back pockets of any useful size.

Current beverage holder devices are very limited in their adjustability, lacking the ability to accommodate a variety of types or sizes of beverage containers. Particularly, other beverage retaining devices do not have a large amount of articulation, and so do not allow the user much flexibility in locating the beverage during use. Furthermore, other devices don't offer much of a security or a self-leveling feature to counteract the motion of traveling in a passenger seat. Moreover, the tray tables associated with passenger seats are needed to support personal items, such as computers, a book, or the like, and so are too small to even support a beverage distributed by the carrier, while using such personal items. Thus, beverage holder devices are needed, but current iterations do not allow the beverage to be accessible while accommodating the changing position of the surface of said tray table to which it is attached (i.e., the tray table positioned and repositioned between up or down, etc.). In other words, when the tray table needs to be moved to the locked position, current devices are just not adaptable enough to satisfactorily support the beverage after the tray table is moved, much less during movement of the tray table.

As can be seen, there is a need for a beverage holder providing a stable, self-leveling, secure, and more convenient location for beverages while accommodating the space limitations inherent in passenger travel. The present invention embodies a device adapted to enhance the limited personal space afforded today's airplane passengers. The present invention also provides more flexibility in the securing and positioning of the beverage location.

The present invention can accommodate a larger variety of type and sizes of beverage containers such as cups, bottles, and cans by providing an adjustable and lockable beverage support ring with multiple support points for secure capture. It also provides a vertical adjustable beverage container support loop to allow effective capture of straight sided beverage containers (i.e., cans or bottles). An adjustable clamping mechanism is provided for engagement with an almost unlimited variety of tray table's shapes and thickness, so that the present invention can be firmly engaged with any tray table, either up or down, due to the clamping mechanism's high friction contact surfaces to reduce slippage from mounting surfaces.

The present invention can provide multiple alternative methods for locating the beverage while in use by moving an adjustable, multi-position support articulated arm that will accommodate different positions and fit many areas within a limited space regardless of the position of the surface to which it is attached. The device provides a larger variety of lockable joints and thereby provides more positions for convenience, security and stability. It also provides a self-leveling option that helps to counteract the motion of the aircraft by featuring a beverage holder support loop that provides a single axis of rotation to allow self-leveling of the beverage in the first plane and mounting provisions for a second beverage holder support that can provide self-leveling in a second plane. This support loop also features a locking mechanism allowing the user to lock the beverage container at a more convenient angle thereby disabling the self-leveling feature. Lastly, it can be folded for convenient storage and portability when not in use.

Though the present invention is designed specifically for use with airline seating, and most of the references are to airplane travel, the present invention is adapted for any tray table where space is constrained, for example seating on a bus or train and almost any flat surface in multiple settings such as home or work.

SUMMARY OF THE INVENTION

In one aspect of the present invention, a beverage holder includes the following: a clamp for removably attaching to a flat surface; a support arm extending between a proximal end and a distal end; the proximal end operatively associated with the clamp so that the support arm is movable in at least two directions between an extended position and a retracted position relative to the clamp in a first direction associated with a first axis; and pivot-ably between an upward position and a downward position relative to the clamp about a second axis orthogonal to the first axis; a holder frame having a generally Y-shaped three prong arrangement providing a two spaced apart leg prongs and an opposing body prong; the distal end pivot-ably connected to the body prong so that the holder frame rotates about the first axis, and so that the holder frame rotates about a third axis orthogonal to the first and second axis; a vertical support loop depending from a distal end of each leg prong, wherein the vertical support loop is adjustable along a longitudinal direction of the second axis; and a horizontal support loop connected to said distal end of each leg prong, wherein the horizontal support loop has a radius that extends along a longitudinal direction of the first axis, and wherein the radius is adjustable.

In another aspect of the present invention, a beverage holder attached to a flat surface includes the following: a support arm extending between a proximal end and a distal end; the proximal end operatively associated with the flat surface so that the support arm is movable in at least two directions: between an extended position and a retracted position relative to the clamp in a first direction associated with a first axis; and pivot-ably between an upward position and a downward position relative to the flat surface about a second axis orthogonal to the first axis; a holder frame having a generally Y-shaped three prong arrangement comprising a two spaced apart leg prongs and an opposing body prong; the distal end pivot-ably connected to the body prong so that the holder frame rotates about the first axis, and so that the holder frame pivots about a third axis orthogonal to the first and second axis; a vertical support loop depending from a distal end of each leg prong, wherein the vertical support loop is adjustable along a longitudinal direction of the third axis; a horizontal support loop connected to said distal end of each leg prong, wherein the horizontal support loop has a radius that extends along a longitudinal direction of the first axis, and wherein the radius is adjustable, wherein the horizontal support loop and the vertical support loop pivot about a shared pivot point along another second axis parallel with the second axis, and wherein the horizontal and vertical support loops are free to rotate about the shared pivot point as a function of a center of gravity of a beverage container retained with said horizontal and vertical support loops so as to be self-leveling; a locking screw operatively associated with the shared pivot point for selectively locking an orientation of the horizontal support loop and the vertical support loop; a clamp locking screw for selectively locking the support arm in a fixed position along the first direction; a horizontal loop locking clamp for locking the horizontal support loop at a selected radius along the longitudinal direction of the first axis; a horizontal locking screw for locking the holder frame at a selected position along the third axis; and an attachment clamp locking screw for locking the support arm at a selected position along the second axis.

These and other features, aspects and advantages of the present invention will become better understood with reference to the following drawings, description and claims.

BRIEF DESCRIPTION OF THE DRAWINGS

FIG. 1 is a rear perspective view of an exemplary embodiment of the present invention;

FIG. 2 is a side perspective view of an exemplary embodiment of the present invention;

FIG. 3 is a side perspective view of an exemplary embodiment of the present invention;

FIG. 4 is a side perspective view of an exemplary embodiment of the present invention, shown in a collapsed condition;

DETAILED DESCRIPTION OF THE INVENTION

Figure 6:
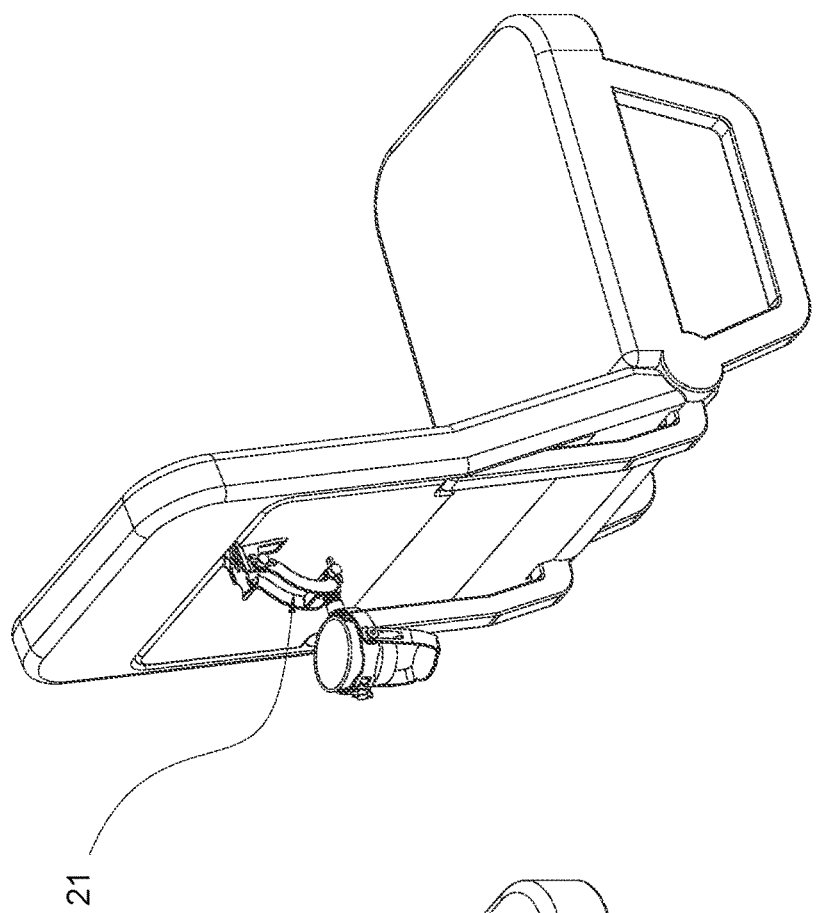
FIG. 6 is a perspective view of an exemplary embodiment of the present invention, shown in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a beverage holder providing a stable, self-leveling, secure, and more convenient location for beverages while enhancing travel seat and tray space limitations.

Referring now to FIGS. 1 through 10, the present invention may include a beverage holder 100 having a two-piece adjustable attachment clamp (TPAAC) 1, a main support arm 2, a beverage holder attachment pin 3, beverage holder frame 4, an adjustable horizontal beverage holder support loop 5, a vertical beverage holder support loop 6, a main attachment clamp locking screw 7, a main support arm to attachment clamp locking screw 8, a beverage holder support loop attachment pin 9, a main support arm to beverage holder frame locking screw 10, a beverage holder horizontal locking screw 11, a beverage holder loop pivot retainer screw 12, a beverage holder support loop locking screw 13, an adjustable beverage holder support loop locking clamp 14, an alternate main support arm frame lock 15, a dual swivel type main support arm 16, a swivel type main support arm locking screw 17, a beverage holder frame mounting pin 18, and a single swivel type main support arm 19.

The TPAAC 1 may be the main attachment point to secure the device to a flat surface. It can be adjusted to various thicknesses and locked into place by a butterfly locking screw. The main support arm 2 is adapted to be a selectively movable, articulating, and lockable connection between the attachment clamp and beverage holding support loops. The beverage holder attachment pin 3 may be the main attachment point for the beverage holder frame and adjustable horizontal beverage holder support loop to the main support arm 2, allowing the entire beverage holder frame 4, attached adjustable horizontal beverage holder support loop 5, and vertical beverage holder support loop 6, to rotate left and right in the horizontal plane up to approximately a range of forty-five degrees in each direction and that it can be locked into desired position with butterfly locking screw. The beverage holder frame 4 may be adapted to attach the adjustable beverage holder support loop 5 to the main support arm, allowing the beverage holder frame, attached adjustable beverage support loop 5, and vertical beverage holder support loop 6 to rotate left or right, or roll, in the longitudinal plane. The adjustable horizontal beverage holder support loop 5 may be adapted to adjustably accommodate different shapes and sizes of beverage containers, and can be locked into place once adjusted to desired size. The vertical beverage holder support loop 6 is also adjustable to support the differently sized beverage containers (i.e., beverage cans or bottles). The main attachment clamp locking screw 7, may be adapted to be used to lock the main attachment clamp so that the beverage holder will remain securely attached to the support surface. The attachment clamp locking 8 may be adapted to allow the main support arm 2 to be locked into the desired vertical position by the user. The beverage holder frame 4 attachment pin 9 may include a locking screw 11 to lock the adjustable clamp-type arm into the desired position. The frame screw 10 may be adapted to allow the beverage holder support loop frame to be locked into the vertical, or pitch, position desired by the user. The beverage holder horizontal locking screw 11 may be adapted to allow the beverage holder support loop to be locked into the desired horizontal position (left, right, or center). The beverage holder loop pivot retainer screw 12 may be adapted to support and connect one side of the beverage holder support ring. The beverage holder horizontal locking screw 13 may be adapted to allow the self-stabilizing feature of the beverage holder to be locked into a desired position thereby disabling this feature. Otherwise, the embodiment as shown is free to rotate and relies on the center of gravity of the beverage to maintain a level orientation. The adjustable beverage holder support loop locking clamp 14 may be adapted to allow the beverage holder support loop to be locked into the desired size.

Figure 8:
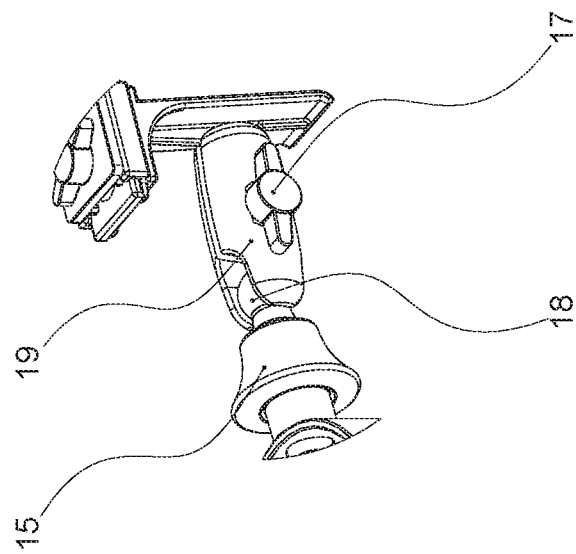
FIG. 8 is a perspective view of an exemplary embodiment of the retractor the present invention, shown in a retracted condition.
Figure 7:
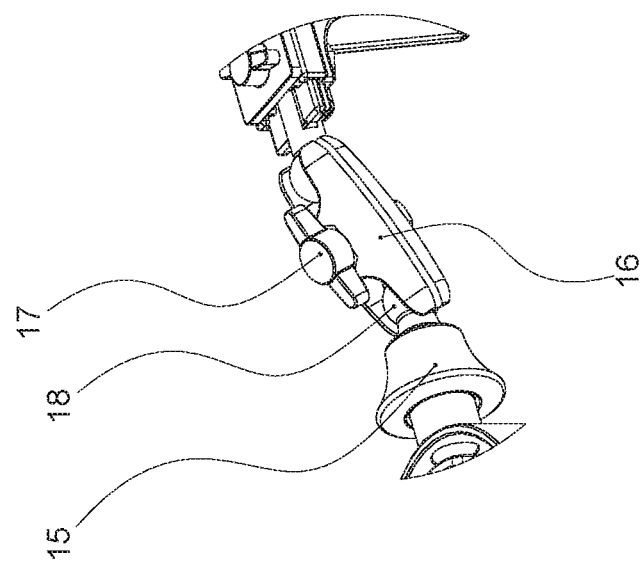
FIG. 7 is a perspective view of an exemplary embodiment of a retractor the present invention, shown in an extended condition, utilizing a sliding collar 15 that engages the "teeth" on beverage holder frame 4 to lock the rotation as desired.

Referring to FIGS. 7 and 8, an alternate main support arm frame lock 15 may be adapted to allow the user to lock the alternate main support arm into desired position. The dual swivel type main support arm 16 may provide an alternate type of support arm that swivels on both ends (FIG. 7) or just one end (FIG. 8); such ball joints enable a universal, uninhibited rotation. The swivel type main support arm locking screw 17 may be adapted to allow the swivel type support arm to be locked in place. The beverage holder frame mounting pin 18 may be adapted to attach the beverage holder frame to swivel arm and allows support arm to be adjusted into desired position. The single swivel type main support arm 19 may provide an alternate type of support arm that swivels on one end.

The TPAAC 1 may be opened, slid over a flat support surface and the clamp squeezed tight by use of the adjustable portion of the clamp. The clamp is then secured by twisting the locking butterfly screw until tight. Depending on the angle of the flat support surface the main support arm 2 may be moved up or down to a position that would be desirable by the user to hold the beverage support ring in a useful and convenient position. It is then locked into the desired position by twisting the locking butterfly screw 8 connecting the main support arm and the attachment clamp until tight. The vertical beverage holder support loop 6 can then be adjusted up or down vertically to the desired position. It is then locked into place by twisting the main support arm to the beverage holder support loop locking screw 13 until tight. The entire beverage holder frame 4, attached adjustable horizontal beverage holder support loop 5, and attached vertical beverage holder support loop 6, can then be further adjusted horizontally by moving it left or right to a desired position. It is then secured in this desired position by twisting the main attachment clamp locking screw 11 until tight. The adjustable horizontal beverage holder support loop 5 may then be adjusted (squeezed or opened) to accommodate the size of the beverage container desired to be supported. The loop is locked into size by twisting the adjustable beverage holder support loop locking clamp 14, until tight. The beverage container requiring support can then be inserted into the adjustable horizontal beverage holder support loop 5. Depending on the type of beverage container desired to be supported, the vertical beverage holder support loop 6 can be positioned vertically to support a straight-sided beverage container such as a bottle or can. Cups generally will have no problem being supported by just the adjustable horizontal beverage holder support loop 5 due to their beveled shape, once the adjustable horizontal beverage holder support loop 5 may be adjusted to the correct size.

Figure 5:
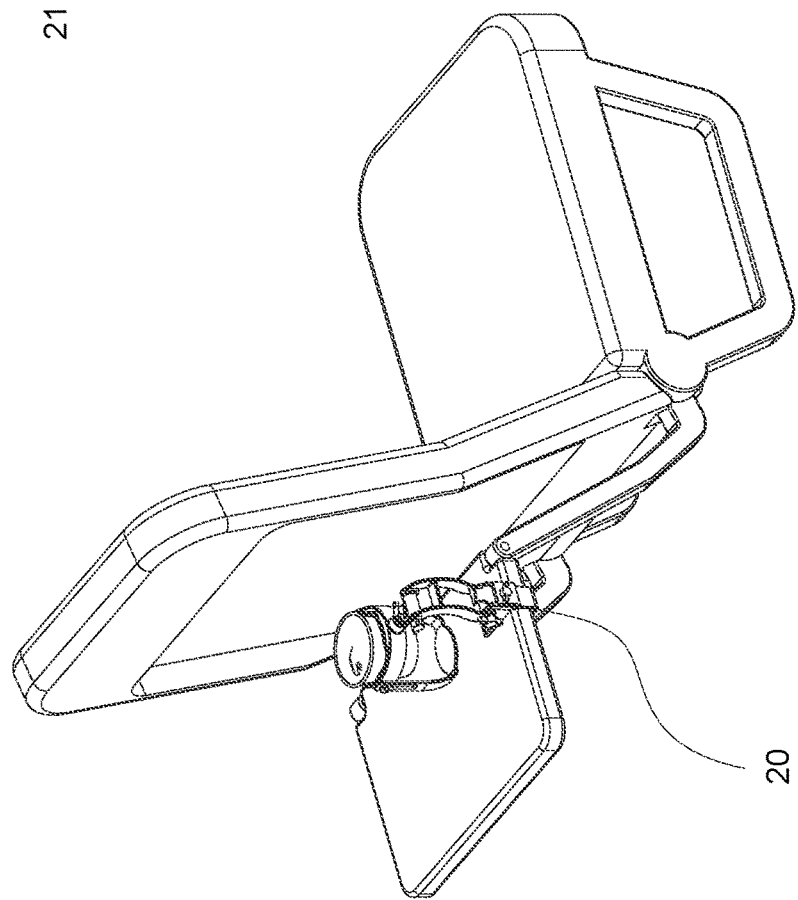
FIG. 5 is a perspective view of an exemplary embodiment of the present invention, shown in use.

As a result, the present invention can be moved and engaged in several conditions, including when the flat attachment surface/tray is moved to an up-and-locked position 21, as illustrated in FIG. 6, or when the tray is in a down position 20, as illustrated in FIG. 5.

The present invention may include custom components and some off the shelf fasteners used in unique configurations. Main components are manufactured by injection molding appropriate plastic resin materials using custom tooling. Some components needing additional strength may use glass fill reinforcement in the resin. In cases where molded components do not have adequate strength or alternate rotational features are desired machined or cast aluminum/metal components may be used. Pivot or clamping features will utilize standard hardware such as nuts and thumbscrews. This use of standard hardware does not preclude the use of custom hardware being used in areas that may affect/enhance the aesthetic appeal of the invention. Some hardware features may be insert molded or press fitted in the inventions molded components. The invention will be delivered to the end user in a fully assembled configuration. As such it will be produced in a manufacturing facility with appropriate production and quality controls.

In order to function as intended the present invention may utilize the following as shown in FIGS. 1 through 4: TPAAC 1, a main support arm 2, a beverage holder attachment pin 3, beverage holder frame 4, an adjustable horizontal beverage holder support loop 5, a vertical beverage holder support loop 6, a main attachment clamp locking screw 7, a main support arm to attachment clamp locking screw 8, a beverage holder support loop attachment pin 9, a main support arm to beverage holder frame screw 10, a beverage holder horizontal locking screw 11, a beverage holder loop pivot retainer screw 12, a beverage holder support loop locking screw 13, an adjustable beverage holder support loop locking clamp 14, an alternate main support arm frame lock or sliding collar 15, a dual swivel type main support arm 16, a swivel type main support arm locking screw 17, a beverage holder frame mounting pin 18, and a single swivel type main support arm 19. An additional pivot can be included as shown by item 3 to allow swinging the cup holder element to the left or right. The free floating two-axis self-centering feature can either be locked out or free floating by actuating components 12 and 13. Improvements to the invention may include non-slip features where the TPAAC 1 contacts the mounting surface allowing further improvements in stability, and potential miniaturization of components which can reduce the folded size for easier/smaller space requirements for the end user.

TPAAC 1 can alternately be substituted with a single piece component that relies on the flexibility/stiffness of the material to provide the clamp force needed to retain the invention to the mounting surface. The arm configuration including component 2 can be substituted with the clamp configuration 16 or 19 providing similar range of adjustment vertically, and horizontally. If desired the attachment pin 3 and the beverage holder frame can be integrated, and the beverage holder frame lock 11 eliminated allowing the yaw tilt feature and lock to be controlled by the ball position in the clamp type arm 16 or 19.

A method of using the present invention may include the following. The beverage holder 100 disclosed above may be provided. A user may utilize the TPAAC 1 to clamp the device to any flat surface. The TPAAC 1 may be locked to the flat surface by twisting the locking butterfly lock to secure the clamp (No. 7). Depending upon the angle of the flat surface, the main support arm (No. 2) is positioned to the most convenient position (up or down) that satisfies the user and is locked into position using the butterfly lock closest to the attachment clamp (No. 8). The beverage support loop frame can also be positioned vertically to the most convenient position that satisfies the user and is locked into position using the butterfly lock (No. 10). The beverage support loop frame can also be positioned left or right to the most convenient position (left or right) that satisfies the user and is locked into position using the butterfly lock (No. 11). The vertical support arm (No. 6) is then lowered to the vertical position to support the beverage container underneath, if required (straight containers such as bottles or cans. This is usually not required when using a cup or other beveled shape container.) The beverage support loop is adjusted to the approximate size of the desired beverage container so that it correctly supports the beverage container and is locked into this size by use of the adjustable beverage support loop locking clamp. (No. 14). If desired, the stabilizing feature of the beverage holder support loop can be "locked out" by twisting the beverage holder support loop lock (No. 13). Finally, the entire device can easily be folded for transportation (No. 24).

The TPAAC 1 may be connected to the tray table, either in the "up and locked" position or the "down position" and provides a stable, secure and more convenient location options of the beverage, thereby enhancing the personal space of the passenger. These features make it easier for the passenger to access the beverage while they are doing work, watching a video, or even sleeping but knowing that the beverage is secure, and in a location that does not impede their movements while seated in the confined area of their airline seat, but is also in a very convenient location for use. Lastly it is universal in what type, shape, and thickness of airline tray tables, and beverage containers, can be accommodated.

Thereby, the present invention has a two-axis floating beverage container loop that is self-centering to compensate for the altering angles of airplane motion, or passenger seat angle when used with a stowed tray table. Alternately this self-centering can be locked out when desired. The device has an adjustable beverage container loop that can be sized and locked for a larger variety of types and sizes of beverage containers. The beverage holder loop assembly is attached to the arm via an adjustable attachment that can pivot along a single axis in a hinged manner and is clamped to a spherical pin, adapted to rotate completely around the pin, and at an angle to said pin, and can contain a separate pivot to allow for the loop to be moved to the side for clearance as needed. The device also has a foldable drop-down vertical beverage container support loop that allows it to be used with straight sided beverage containers such as cans or bottles as well as cups. Lastly, the horizontal support loop can be adjusted left or right in the horizontal plan, rotated side-to-side, and also locked in place, to add more versatility for personal space and comfort.

Figure 10:
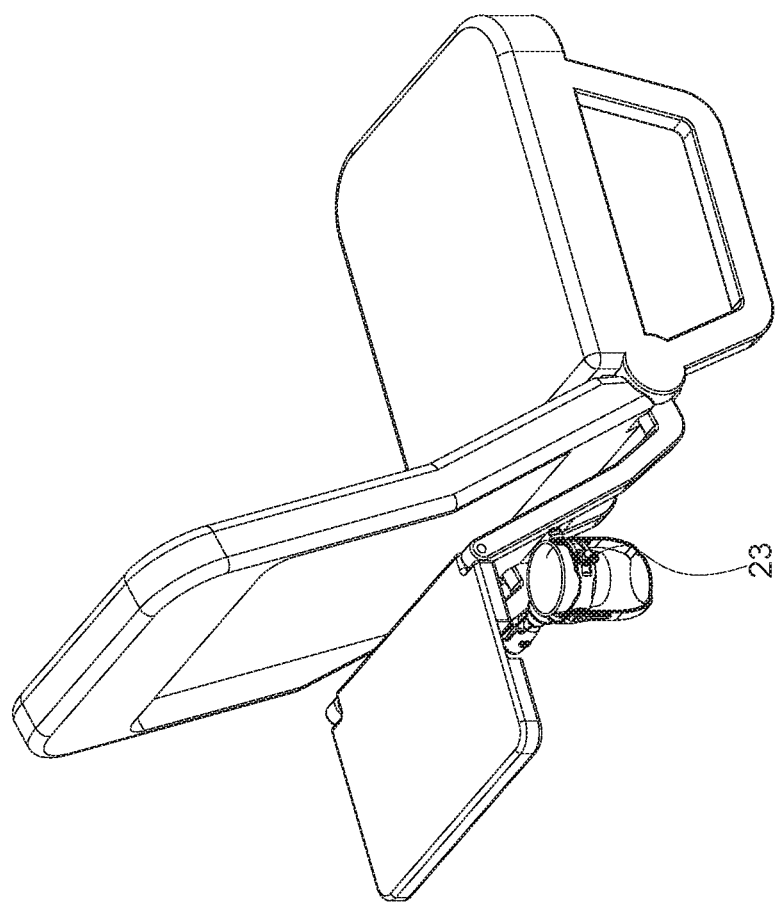
FIG. 10 is a perspective view of an exemplary embodiment of the built-in version of the present invention, shown in use.
Figure 9:
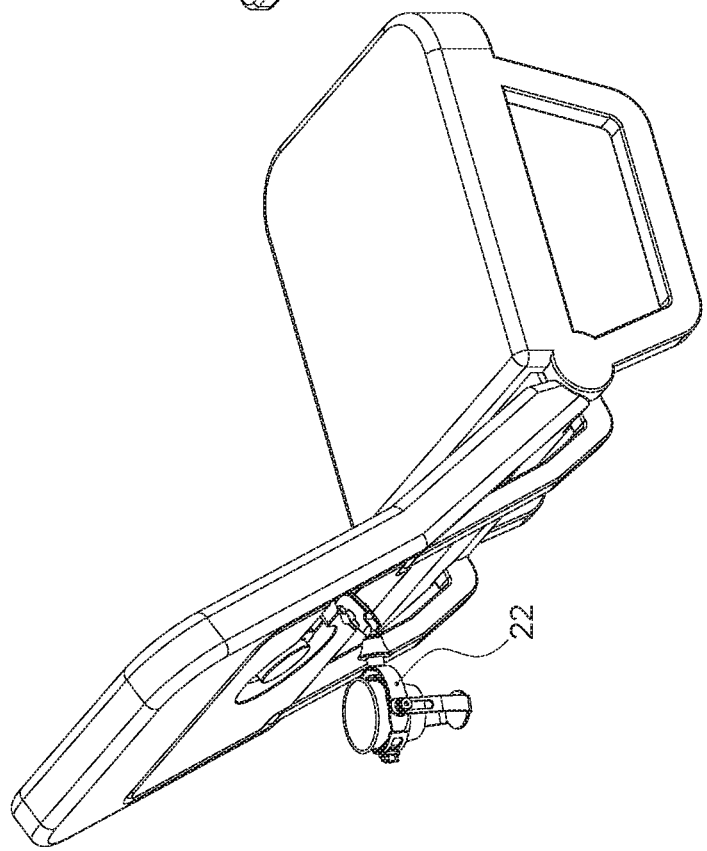
FIG. 9 is a perspective view of an exemplary embodiment of a built-in version of the present invention, shown in use.

Additionally, the present invention can also be integrated into other components such as tray tables, seat armrests, or other similar items, as illustrated in FIGS. 9 and 10, demonstrating wherein the beverage holder 100 may be integrated/built into the tray table in use with the airline tray table in an integrated up and locked configuration 22 and an integrated down configuration 23.

If manufactured correctly this would allow the airline to offer a convenience that is not offered at this time. It would give much needed relief to the customer while eliminating the need for the customer to carry their own, portable version of this beverage holder. It can also be used with any flat surface, such as with an office, or other table, in the horizontal and vertical positions. This flat surface can be oriented horizontal, vertical or any angle in between. Additionally, the beverage holder 100 can be used in any space confined situation.

Lastly, there are alternative designs of the main support arm, as illustrated in FIGS. 7 and 8, that allow alternative methods of integrating the device into different components or give the customer alternative choices of the final manufactured product.

It should be understood, of course, that the foregoing relates to exemplary embodiments of the invention and that modifications may be made without departing from the spirit and scope of the invention as set forth in the following claims.

What is claimed is:

1. A beverage holder, comprising: a support arm extending between a proximal end and a distal end; the proximal end pivotal between an upward position and a downward position about a first horizontal axis, identified by a first fastener; a holder frame having a generally Y-shaped yoke with a three prong arrangement comprising two leg prongs and a body prong; the proximal end pivotally connected to the body prong so that the holder frame rotates about a second horizontal axis that is orthogonal to said first horizontal axis; and a third horizontal axis, identified by a second fastener, wherein the first and second horizontal axes enable a collapsed condition; a vertical support loop depending from a distal end of each leg prong, wherein the vertical support loop is adjustable along a longitudinal direction of the third axis; and a horizontal support loop connected to said distal end of each leg prong, wherein the horizontal support loop has a radius that extends along a longitudinal direction of the first axis, and wherein the radius is adjustable; and further comprising a clamp pivotably attached to the distal end of the support arm, and wherein the collapsed condition has the clamp circumscribed by the horizontal support loop.

2. The beverage holder attached of claim 1, wherein the horizontal support loop and the vertical support loop pivot about a shared pivot point along yet another horizontal first axis parallel with the other two horizontal first axis.

3. The beverage holder of claim 2, further comprising a locking screw operatively associated with the shared pivot point for selectively locking an orientation of the horizontal support loop and the vertical support loop.

4. The beverage holder of claim 3, further comprising a horizontal loop locking clamp for locking the horizontal support loop at a selected radius along the longitudinal direction of the first axis.

5. The beverage holder of claim 4, further comprising a horizontal locking screw for locking the holder frame at a selected position along the third axis.

6. The beverage holder of claim 5, further comprising an attachment clamp locking screw movable between an unlocked position and a locked position locking the clamp pivotably relative to the distal end.

7. The beverage holder of claim 6, wherein the horizontal and vertical support loops are free to rotate about the shared pivot point as a function of a center of gravity of a beverage container retained with said horizontal and vertical support loops so as to be self-leveling.

8. The beverage holder of claim 7, wherein the clamp has two flanges that are selectively movable relative to each other, and wherein a clamp locking screw is movable between a locked position and an unlocked position selectively locking the two flanges a selected distance from each other.

9. The beverage holder of claim 1, further comprising a tray, the tray is integrated to the proximal end.

* * * * *